Dec. 5, 1933.     E. D. STAFNEY     1,937,797

MILK COOLING APPARATUS

Filed July 30, 1932

Inventor
Edwin D. Stafney
By Gillson, Mann & Co.
Attys

Patented Dec. 5, 1933

1,937,797

UNITED STATES PATENT OFFICE 1,937,797

MILK COOLING APPARATUS

Edwin D. Stafney, Batavia, Ill.

Application July 30, 1932. Serial No. 626,584

7 Claims. (Cl. 62—101)

This invention relates to heat exchange devices and more particularly to apparatus for cooling milk and the like.

The principal object of the invention is the provision of new and improved means for cooling freshly drawn milk efficiently and in an economical manner.

Another object of the invention is the provision of a new and improved milk cooling apparatus for using a novel method of employing a cooling fluid for cooling milk and the like.

A further object of the invention is the provision of a new and improved milk cooling system that may use artificial or natural means for cooling a liquid and that may readily be expanded to any required capacity.

A still further object of the invention is the provision of a new and improved cooling apparatus having novel means for causing a cooling liquid to flow through the apparatus and for controlling such flow together with means for cleaning the apparatus.

A still further object of the invention is the provision of a new and improved apparatus for cooling milk or other articles, that is simple in construction, inexpensive to manufacture, efficient in operation, easy to keep clean, and that is not likely to become disarranged or get out of order.

Other and further objects and advantages of the invention will appear from the following description taken in connection with the accompanying drawing, in which Fig. 1 is a longitudinal, vertical section of the apparatus, shown more or less diagrammatically and with parts broken away;

Figure 1:
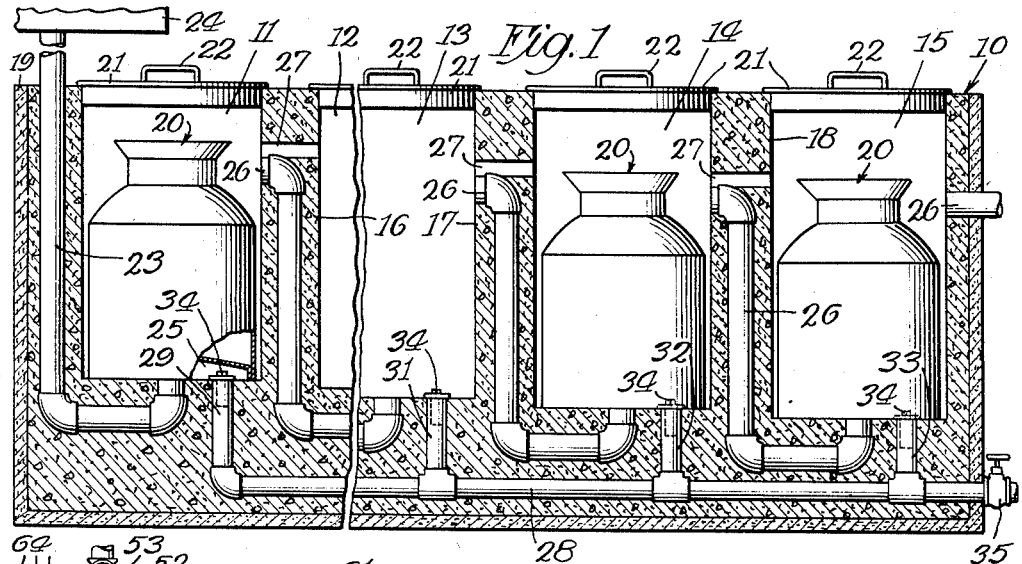

Bacteria multiply very rapidly in freshly drawn milk, and for that reason the milk is chilled or cooled quickly as soon after it is drawn as possible. Various devices have been proposed. While some are very efficient their cost of installation is prohibitive, while others are not practical for various reasons. It is common practice, in the cooling of milk, to surround the cans or milk receptacles with comparatively still water in a container and continuously agitate the milk in order to effect a rapid exchange of heat. This arrangement is objectionable because of the work required in agitating the milk and the danger of contamination by the stirrers.

The present invention seeks to eliminate these objectionable features by the provision of a new and improved apparatus wherein the water is circulated about the receptacles containing the milk, without the necessity of stirring the milk, although stirrers may also be employed if desired.

Referring now to the drawing, the reference character 10 designates a cooling system the physical structure of which may be arranged in any convenient shape or form, and may be constructed of any suitable material. For the purpose of disclosure the device will be described and shown as adapted for use in a dairy for cooling freshly drawn milk.

In the form of the construction selected to illustrate one embodiment of the invention, the cooling apparatus is shown at 10, and comprises a series of cooling chambers 11, 12, 13, 14 and 15, five being shown, although the number may be extended to meet the requirements of the dairy, or farmer's family, as the case may be. These chambers may be constructed of any suitable material. A convenient and practical method of constructing them is to form these chambers in a concrete unit or block. The chambers are separated by partitions 16, 17 and 18. The bottoms of the chambers are at progressively lower levels from one end of the unit to the other. As shown, the chamber at the left in Fig. 1 is on the highest level. These chambers are adapted to receive milk receptacles, such as the conventional milk cans 20. Preferably the diameters of the chambers are but slightly larger than the cans, whereby a complete change of water is had rapidly and with the use of a minimum amount of water.

The unit may be, and preferably is, surrounded with insulating material 19, and each of the chambers or wells is closed by an insulated closure 21, having a suitable handle 22 thereon.

Suitable means are provided for circulating a cooling fluid through the cooling chambers. In the form of construction shown in Fig. 1, conduits are provided for conducting water from one chamber to the next lower chamber.

Preferably, though not necessarily, these conduits are within the walls of the apparatus. A conduit 23 is adapted to conduct cool water from a suitable source of supply, as the tank 24, and deliver it through the bottom of the chamber 11 into said chamber. The opening into the chamber may be in the center thereof, whereby water will be delivered into the depression 25 in the bottom of the can. An overflow conduit 26 conducts the water from the top portion of the chamber or well 11 into the lower portion of the next adjacent chamber 12, and so on to all the chambers to the last chamber 15, where the water flows through the conduit or opening 26 to the outside of the system or to the sewer.

The discharge conduits 26 are placed at such a level that the water will not overflow the cans but will insure the cans being submerged at least to a level above that of the milk in the cans.

Suitable emergency overflow passages 27 are provided just above the conduit openings 26, and which are located just below the mouths or upper portions of the cans in the respective wells or chambers for preventing the water overflowing the cans in case of stoppage in any of the overflow conduits 26.

It will thus be seen that since each chamber is but slightly larger than the can, that there is a rapid change of water and consequently there will be a rapid cooling of the milk, since the water is not permitted to stand and act as an insulating blanket, as is the case where there is a slow change of water or no movement at all of the water in the cooling trough.

Suitable means are provided for washing or cleaning the chambers or wells 11, 12, 13, 14 and 15. As shown in Fig. 1, a conduit 28 is provided for this purpose in the bottom wall of the cooling unit, and branch conduits 29, 31, 32 and 33, extending into the bottom of the wells or chambers 11, 13, 14 and 15, respectively. Each of these branch conduits is closed by a suitable valve or weighted stopper 34, which is adapted to extend into the depression 25 in the cans, which provides sufficient clearance for the same, as shown at the left in Fig. 1.

If it is desired to use only a few of the chambers or wells, the stopper may be removed from the next adjacent chamber below the ones being used, and the water will escape into the pipe or conduit 28 without entering the remaining chambers. The pipe 28 may be provided with a valve 35, whereby the same may be closed when desired. It may be closed when it is desirable to recirculate the water by a pump or the like, and is preferably closed when all the chambers or wells are in use.

In the operation of the device water enters the chamber 11 through the conduit 23, and overflows into the next chamber 12 through the overflow conduit 26, and so on to the other chambers in succession, the openings of the overflow conduits being progressively on a lower plane to correspond with the bottom walls of the chambers, which are also on a progressively lower plane.

For convenience of description the cooling chambers will be regarded as being on a progressively lower plane, although the upper or top wall of the unit 10 may be horizontal, as shown. This top wall, however, may be inclined, or each portion above the wells or chambers may be on a progressively lower level to correspond with the bottoms of the cooling chambers.

Figure 2:
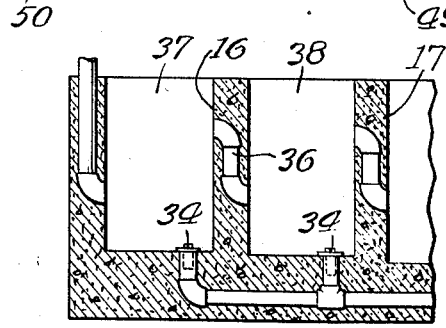
Fig. 2 is a similar view of a portion of a milk cooler, showing a modified form of construction.

The construction shown in Fig. 2 differs from that just described in that the conduit 36, for conducting water from one chamber 37 to the next lower chamber 38, delivers the water to the next lower chamber through the side wall at a point above the bottom of the chamber. In this form of construction the water flowing into the chamber through the conduit 36 will be at a lower temperature than the water already therein, and will, therefore, sink to the bottom of the well or chamber, thus insuring a continual change of water therein. In practice, however, the form shown in Fig. 1 is more desirable than that shown in Fig. 2.

Figure 3:
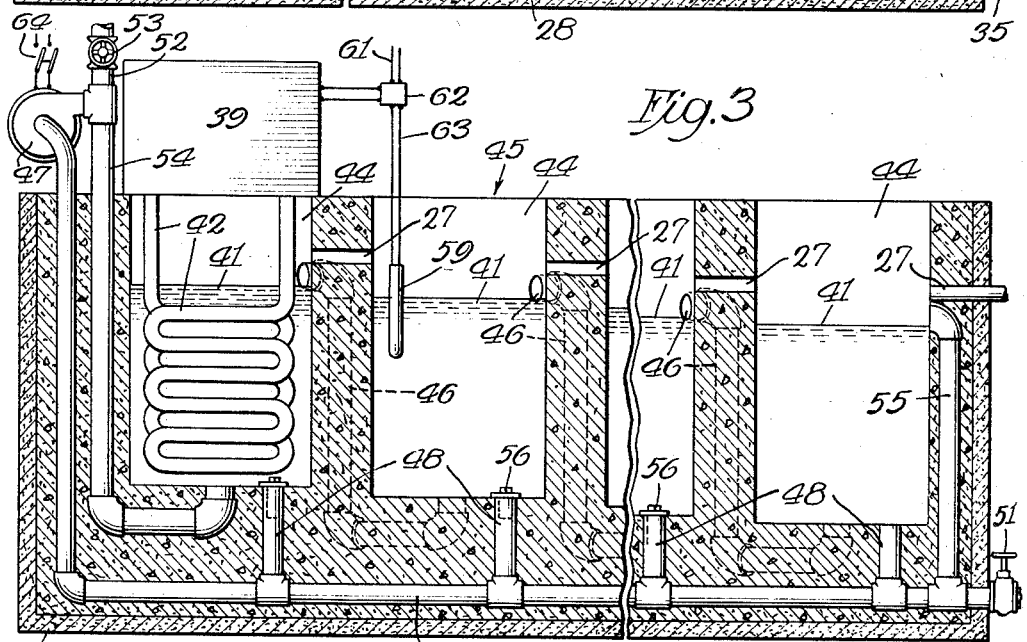
Fig. 3 is a view similar to Fig. 1 and showing a still further modified form of the invention.

It may be desirable to recirculate the water; or, where it is desirable to employ artificial cooling mechanism, the form of construction shown in Fig. 3, or equivalent mechanism, may be employed.

In this form of construction, suitable means are provided for lowering the temperature of the cooling medium. As shown, a conventional refrigerating or cooling unit 39 of the usual or any well known construction is employed for this purpose. This unit has the cooling coil 42 which may be located in the first well or cooling chamber 44 of the cooling apparatus or unit 45.

The unit 45 may be of substantially the same construction as shown in Fig. 1 and comprises a concrete block having the wells or chambers 44 therein and having the overflow passages 46 arranged the same as in the previous construction.

In this form of construction, it is desirable to recirculate the cooling medium which may be water, brine, or any other suitable liquid. The cooling fluid 41 is circulated by a pump 47 located at any convenient position. For convenience of installation and inspection, it may be located on top of the unit 45, as shown. The intake of the pump is connected to the conduit 49 which corresponds to the conduit 28 in the construction shown in Fig. 1.

If the entire unit is to be used, the valve 51 is closed and water is introduced from a source of supply through the pipe 52 to properly fill the system, after which the valve 53 is closed. The pump 47 discharges through the conduit 54 into the first well or container 44 which overflows into the other wells and the water returns through the conduit 55 in the end wall of the unit and the conduit 49 in the bottom wall thereof.

Valves or stoppers 56 are provided for closing the branch conduits 48 when only a few of the cooling chambers are to be used. These valves 56 correspond to the valves or stoppers 34 in the former construction. For instance, when it is desired to employ only the first cooling well below the one containing the coil 42, the valve 56 in the next chamber below is opened, whereby the cooling medium will circulate through the first cooling chamber and through the branch conduit 46 into the next cooling chamber below, and from thence into the conduit 49 and back to the pump. During the normal operation of the device, when all of the chambers are being employed, all of the valves 56 are closed.

Suitable means are provided for controlling the operation of the cooling or refrigerating unit 39. In the form of construction shown a thermostat 59 is employed for this purpose. The refrigerating unit 39, for the purpose of illustrating the invention, is shown as being electrically operated, the current being conducted to the device through the leads 61 and a switch 62. The switch 62 is adapted to be operated by a thermostat 59 for opening and closing the circuit through the cooling unit 39. This thermostat may be attached to flexible leads 63, which permit the same to be moved from one chamber to another as occasion may require.

As shown, the thermostat is located in the chamber 44 adjacent to the one containing the coil 42, and the device is adjusted so that the temperature of the water in the chamber 44 will be maintained at a desirable constant. When the temperature in the cooling chamber rises above a predetermined amount, the thermostat closes the circuit, which will operate the switch 62 for closing the circuit through the cooling unit 39. The cooling unit will then operate until the temperature is lowered to a predetermined amount, when the thermostat will operate the switch 62 for opening the circuit.

By means of this arrangement the water circulating through the cooling system may be maintained between predetermined limits of temperature.

The pump 47 may be operated in any suitable manner. As shown, it is electrically operated, and the circuit through the same is controlled by a conveniently located switch 64.

Figure 4:
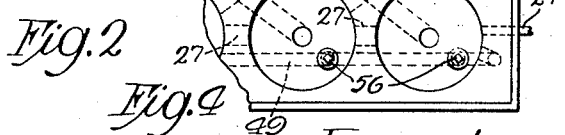
Fig. 4 is a plan of a portion of the construction shown in Fig. 3 with parts broken away.

As shown in Fig. 4, the overflow conduits 46 may be offset relative to the chambers 44, whereby the partitions between the chambers may be reduced to a minimum in thickness.

While the chambers are shown as being formed in concrete and arranged in alinement, it is understood that they may be arranged in a plurality of rows or in staggered relation, and that the cooling chambers may be individually constructed. In any event it is desirable that they be inclosed in a suitable heat insulation material 50.

It is thought from the foregoing taken in connection with the accompanying drawing that the construction and operation of my device will be apparent to those skilled in the art, and that changes in size, shape, proportion and details of construction may be made without departing from the spirit and scope of the appended claims.

I claim as my invention—

1. In combination, a cooling unit comprising a plurality of cooling chambers separated by partitions, said chambers adapted to receive receptacles, passages for conducting a cooling fluid from the upper portion of each container to the lower portion of the next adjacent chamber and discharging the same upwardly through the central portion of the bottom thereof.

2. In a cooling system, a cooling unit comprising a container of unitary construction, partitions for dividing said container into a plurality of cooling chambers, said chambers being arranged in a series at progressively lower levels, a conduit for conducting a cooling fluid to the container on the highest level, and overflow pipes for conducting said fluid successively to the cooling chambers on the lower levels, said conduits and overflow pipes being located wholly within the walls of said container.

3. In a milk cooling system, a concrete block, insulating material extending about said block, cooling chambers within said block for receiving milk cans, the bottoms of said chambers being at progressively lower levels from one end of the block to the other, conduits within the walls of said chambers for conducting a cooling fluid from a point in the wall of each chamber at a point just below the level of the top of the can therein to the bottom of the next adjacent chamber below, a conduit for conducting said fluid from a source of supply to the bottom of the chamber on the highest level, and insulated covers for said chambers.

4. In a milk cooling apparatus, a concrete block having a series of cooling chambers therein, conduits connecting said chambers in series, said conduits being contained wholly within the walls of said block, certain of said conduits conducting said medium from the upper portion of certain of said chambers and delivering the same to the bottom portion of the next adjacent chamber, a pump for circulating a cooling medium through said chambers and conduits, means for cooling said medium, and temperature controlled means for controlling said last-named means.

5. In combination, a block of concrete having a plurality of cooling chambers therein, said chambers being in alinement and at progressively lower levels, a conduit within said block for conducting water from a source of supply into the bottom of the highest chamber, and conduits in said block for conducting water from the top of one chamber to the next adjacent lower chamber, said conduits being offset from the plane of the axes of said chambers.

6. In a milk cooling apparatus, a plurality of cooling chambers having their bottom walls at progressively lower levels, a conventional milk can in each chamber, means for conducting water from the upper portion of each chamber to the bottom of the adjacent chamber beneath the can therein whereby water supplied to the chamber having its bottom wall on the highest level will overflow successively to each of the other chambers and the level of the water in each chamber will be but slightly below the top of the milk can therein, and temperature controlled means for maintaining the temperature of said water below a predetermined minimum.

7. In a milk cooling apparatus, a plurality of cooling chambers at progressively lower levels, conduits for conducting water successively from the highest to the lowest of said chambers by gravity, a passage extending along said chambers below the bottom level of each, branch conduits for conducting water from the bottom of said chambers to said passage, and means for independently closing each of said branch conduits.

EDWIN D. STAFNEY.